United States Patent
Kim

(10) Patent No.: US 9,885,857 B2
(45) Date of Patent: Feb. 6, 2018

(54) ZOOM LENS SYSTEM

(71) Applicant: HANWHA TECHWIN CO., LTD., Changwon-si (KR)

(72) Inventor: Ji-sung Kim, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 53 days.

(21) Appl. No.: 13/934,525

(22) Filed: Jul. 3, 2013

(65) Prior Publication Data

US 2014/0185147 A1 Jul. 3, 2014

(30) Foreign Application Priority Data

Jan. 3, 2013 (KR) .................. 10-2013-0000635

(51) Int. Cl.
*G02B 15/14* (2006.01)
*G02B 15/173* (2006.01)

(52) U.S. Cl.
CPC .................. *G02B 15/173* (2013.01)

(58) Field of Classification Search
CPC .... G02B 15/14; G02B 15/173; G02B 15/177; G02B 15/161; G02B 13/00; G02B 13/04; G02B 13/06; G02B 9/34
USPC ....... 359/680, 687, 688, 684, 692, 690, 766, 359/715, 740, 686, 749–753
See application file for complete search history.

(56) References Cited

U.S. PATENT DOCUMENTS

| | | | |
|---|---|---|---|
| 5,233,471 A * | 8/1993 | Nakamura et al. | 359/684 |
| 6,049,431 A * | 4/2000 | Tochigi | 359/687 |
| 7,199,942 B2 | 4/2007 | Miyazawa | |
| 7,623,299 B2 | 11/2009 | Kuroda et al. | |
| 8,144,402 B2 | 3/2012 | Kim | |
| 2008/0198476 A1 | 8/2008 | Kimura | |
| 2009/0225198 A1* | 9/2009 | Watanabe et al. | 348/240.3 |
| 2010/0254024 A1* | 10/2010 | Hagiwara | 359/687 |
| 2011/0085250 A1 | 4/2011 | Hagiwara | |
| 2011/0085251 A1* | 4/2011 | Iwasawa | 359/687 |
| 2011/0157720 A1* | 6/2011 | Katsuragi | G02B 15/173 359/684 |
| 2012/0105693 A1 | 5/2012 | Hagiwara | |

(Continued)

FOREIGN PATENT DOCUMENTS

| | | |
|---|---|---|
| CN | 1922529 A | 2/2007 |
| CN | 101251637 A | 8/2008 |

(Continued)

OTHER PUBLICATIONS

Communication dated Feb. 3, 2017, issued by the State Intellectual Property Office of the People's Republic of China in counterpart Chinese Application No. 201310395099.5.

*Primary Examiner* — Jie Lei
(74) *Attorney, Agent, or Firm* — Sughrue Mion, PLLC

(57) ABSTRACT

A zoom lens system including, in an order from an object to an image: a first lens group having positive refractive power; a second lens group having negative refractive power; a third lens group having positive refractive power; and a fourth lens group having positive refractive power, wherein zooming is performed by changing intervals between the first through fourth lens groups, and a lens included in the fourth lens group satisfies:

$vd\_10>75$, wherein vd_10 denotes an Abbe number of a line d of the lens included in the fourth lens group.

17 Claims, 7 Drawing Sheets

(56) References Cited

U.S. PATENT DOCUMENTS

2012/0176686 A1* 7/2012 Yoo ............................. 359/684
2012/0327518 A1* 12/2012 Yamano ....................... 359/684
2013/0235464 A1* 9/2013 Yun et al. .................... 359/650

FOREIGN PATENT DOCUMENTS

| | | | |
|---|---|---|---|
| CN | 101859018 | A | 10/2010 |
| CN | 101988986 | A | 3/2011 |
| CN | 102736228 | A | 10/2012 |
| JP | 2006-106111 | A | 4/2006 |
| JP | 2006178193 | A | 7/2006 |
| KR | 1020100055950 | A | 5/2010 |
| KR | 1020100118890 | A | 11/2010 |
| KR | 1020120047747 | A | 5/2012 |

* cited by examiner

ZOOM LENS SYSTEM

CROSS-REFERENCE TO RELATED PATENT APPLICATION

This application claims priority from Korean Patent Application No. 10-2013-0000635, filed on Jan. 3, 2013, in the Korean Intellectual Property Office, the disclosure of which is incorporated herein in its entirety by reference.

BACKGROUND

1. Field

Apparatuses consistent with exemplary embodiments relate to a zoom lens system, and more particularly, to a 4-group zoom lens system.

2. Description of the Related Art

Storage capacity of a photographing apparatus that captures an image by using a charge-coupled device (CCD) or a complementary metal-oxide semiconductor (CMOS) is to be increased as the photographing apparatus becomes digital. As the storage capacity increases, a lens system employed in the digital photographing apparatus is required to have relatively high optical performance and a relatively small size.

In order to clearly record small information of a subject, the lens system may satisfactorily compensate for aberration generated around a screen. However, it is difficult to miniaturize the lens system if relatively high performance is to be realized, and manufacturing costs increases to miniaturize the lens system. Thus, it is difficult to simultaneously satisfy relatively high optical performance such as high magnification and high resolution and relatively low manufacturing costs.

SUMMARY

One or more exemplary embodiments provide a zoom lens system capable of minimizing an overall length, having high magnification, and having relatively high optical performance to meet a high pixel requirement.

According to an aspect of an exemplary embodiment, there is provided a zoom lens system including, in an order from an object to an image: a first lens group having positive refractive power; a second lens group having negative refractive power; a third lens group having positive refractive power; and a fourth lens group having positive refractive power, wherein zooming is performed by changing intervals between the first through fourth lens groups, and a lens included in the fourth lens group satisfies:

$$vd\_10 > 75,$$

wherein $vd\_10$ denotes an Abbe number of a line d of the lens included in the fourth lens group.

A second lens second closer to the object in the first lens group may satisfy:

$$65 < vd\_2 < 72,$$

wherein $vd\_2$ denotes an Abbe number of the line d of the second lens.

The fourth lens group may include a single positive lens, wherein $vd\_10$ is an Abbe number of the positive lens of the fourth lens group.

The fourth lens group may include a single positive lens.
The fourth lens group may include an aspheric surface.
The zoom lens system may satisfy:

$$35 < Ft/Fw < 40,$$

wherein Ft denotes a focal length in a tele-mode of the zoom lens system, and Fw denotes a focal length in a wide-mode of the zoom lens system.

The zoom lens system may satisfy:

$$1.6 \leq Fno\_w \leq 1.9,$$

wherein $Fno\_w$ denotes an F-number of the zoom lens system in the wide-mode.

The third lens group may include at least two lenses, and a distance between the at least two lenses is equal to or greater than 1.8 mm.

The zoom lens system may satisfy:

$$4.8 \text{ mm} \leq BFL,$$

wherein BFL denotes a back focal length of the zoom lens system.

A first lens closest to the object in the first lens group may satisfy:

$$Nd\_1 \geq 1.8;$$

and $$ED\_1 \leq 40 \text{ mm},$$

wherein $Nd\_1$ denotes a refractive index of the first lens, and $ED\_1$ denotes an effective diameter of the first lens.

A third lens third closer to the object in the first lens group may satisfy:

$$vd\_3 > 58;$$

and $$nd\_3 > 1.55,$$

wherein $vd\_3$ denotes an Abbe number of the line d of the third lens, and $nd\_3$ denotes a refractive index of the line d of the third lens.

The fourth lens group and the fourth lens group may move during zooming, and the first lens group and the third lens group are fixed.

The third lens group may include a positive lens and a negative lens in the order from the object.

The third lens group may include the positive lens having at least one aspheric surface.

The second lens group and the third lens group may include lenses having a refractive index greater than 1.9.

According to an aspect of another an exemplary embodiment, there is provided a zoom lens system including, in an order from an object to an image: a first lens group having positive refractive power; a second lens group having negative refractive power; a third lens group having positive refractive power; and a fourth lens group having positive refractive power, wherein zooming is performed by changing intervals between the first through fourth lens groups, and a total number of lenses forming the first through fourth lens groups is less than or equal to 10.

The fourth lens group may include a single positive lens.
The single positive lens may include an aspheric surface.
A lens included in the fourth lens group may satisfy:

$$vd\_10 > 75,$$

wherein $vd\_10$ denotes an Abbe number of a line d of the lens included in the fourth lens group.

The zoom lens system may satisfy:

$$35 < Ft/Fw < 40,$$

wherein Ft denotes a focal length in a tele-mode of the zoom lens system, and Fw denotes a focal length in a wide-mode of the zoom lens system.

BRIEF DESCRIPTION OF THE DRAWINGS

The above and other aspects will become more apparent by describing in detail exemplary embodiments with reference to the attached drawings, in which.

DETAILED DESCRIPTION OF THE EXEMPLARY EMBODIMENTS

Hereinafter, the inventive concept will be described more fully with reference to the accompanying drawings, in which exemplary embodiments are shown. The inventive concept may, however, be embodied in many different forms and should not be construed as being limited to the embodiments set forth herein; rather, these embodiments are provided so that this disclosure will be thorough and complete, and will fully convey the inventive concept to those skilled in the art. Unless defined otherwise, technical and scientific terms used herein have the same meaning as is commonly understood by one of skill in the art to which this inventive concept belongs. An expression used in the singular encompasses the expression of the plural, unless it has a clearly different meaning in the context. Also, it is to be understood that the terms such as "comprise" and/or "comprising" are intended to indicate the existence of the features, numbers, steps, actions, components, parts, or combinations thereof, and are not intended to preclude the possibility that one or more other features, numbers, steps, actions, components, parts, or combinations thereof may exist or may be added. Terms such as first, second, etc. may be used to describe various elements, but these terms do not limit elements and are used only to classify one element from another.

Figure 1:
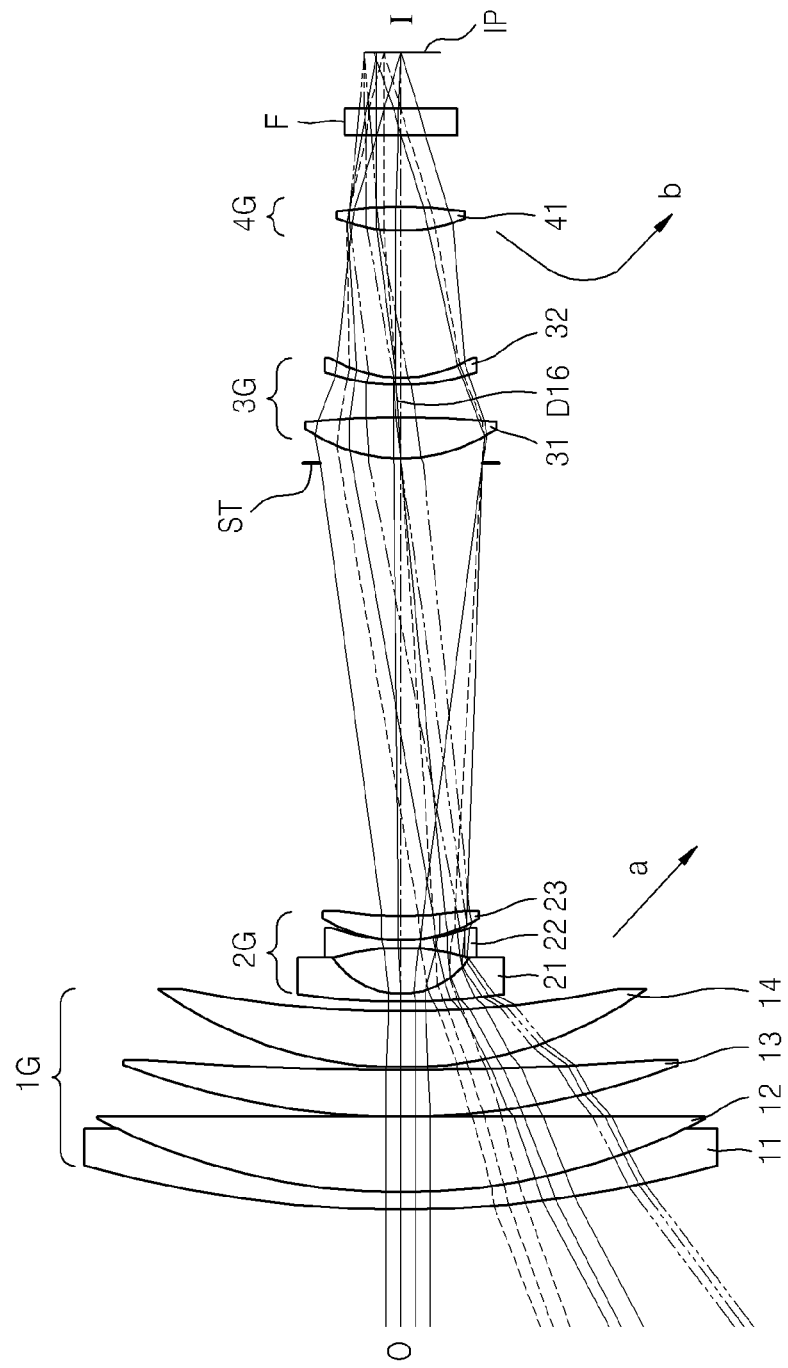
FIG. 1 illustrates a zoom lens system, according to an exemplary embodiment.

FIG. 1 illustrates a zoom lens system, according to an exemplary embodiment.

Referring to FIG. 1, the zoom lens system includes a first lens group G1 having positive refractive power, a second lens group G2 having negative refractive power, a third lens group G3 having positive refractive power, and a fourth lens group G4 having positive refractive power in an order from an object O to an image I. The number of whole lenses may be equal to or less than 10. An aperture ST may be disposed between the second and third lens groups G2 and G3. An optical block corresponding to an optical filter F may be disposed between the fourth lens group G4 and an image plane IP.

The first lens group G1 may include four lenses including a first lens 11, a second lens 12, a third lens 13, and a fourth lens 14. The first lens 11 may be a meniscus lens having negative refractive power and a convex surface facing the object O. The second lens 12 may be a biconvex lens or a plane convex lens having positive refractive power.

The second lens group G2 may include three lenses. The second lens group G2 may include a fifth lens 21, a sixth lens 22, and a seventh lens 23. The fifth lens 21 and the sixth lens 22 may be negative lenses. The seventh lens 23 may be a positive lens.

The third lens group G3 may include at least one aspheric surface. The third lens group G3 may include two lenses including an eighth lens 31 and a ninth lens 32. The eighth lens 31 may have positive refractive power. The ninth lens 32 may include negative refractive power. The eighth lens 31 may have an aspheric surface.

The second lens group G2 and the third lens group G3 may include lenses having a high refractive index, and thus, the zoom lens system having high magnification may be implemented. For example, the second lens group G2 and the third lens group G3 may include lens or lenses having a refractive index equal to or higher than 1.9.

The fourth lens group G4 may include a single lens. For example, the fourth lens group G4 may include a tenth lens 41 having positive refractive power. The fourth lens group G4 includes only the tenth lens 41, and thus, the zoom lens system having a small size and an excellent sensitivity may be implemented. In addition, an assembly tolerance may be reduced when the zoom lens system is assembled, thereby enhancing an assembling property.

The zoom lens system according to the present embodiment may be applied to a photographing apparatus such as a surveillance camera, a still camera, or a video camera. The photographing apparatus may include a solid image sensor device such as a charged coupled device (CCD) or a complementary metal-oxide semiconductor device (CMOS). The solid image sensor device is disposed in the image plane IP of the zoom lens system according to an exemplary embodiment. Light incident from the object O of the zoom lens system may arrive at the image plane IP and may form an image on the solid image sensor device.

The zoom lens system may change a distance between the first through fourth lens groups G1-G4 to perform zooming. During zooming from a wide-mode to a tele-mode (i.e. zooming to high magnification), a distance between the first and second lens groups G1 and G2 may increase, a distance between the second and third lens groups G2 and G3 may decrease, and a distance between the third and fourth lens groups G3 and G4 may decrease and then, increase.

At least two lens groups may move during zooming. During zooming, the first and third lens groups G1 and G3 may be fixed with respect to the image plane IP, and the second and fourth lens groups G2 and G4 may move. The second lens group G2 may move in a direction of an arrow "a" of FIG. 1 to implement magnification, and the fourth lens group G4 may move along a parabolic trace as a direction of an arrow "b" of FIG. 1 to focus and to compensate for lateral chromatic aberration that may be generated during zooming.

The zoom lens system according to an exemplary embodiment may satisfy Conditions below.

The zoom lens system according to an exemplary embodiment may satisfy Condition 1 below:

$$vd\_10 > 75,$$ [Condition 1]

where vd_10 denotes an Abbe number of a line d of the tenth lens 41 comprised in the fourth lens group G4, i.e., a chromatic value.

Condition 1 defines the Abbe number of a lens, i.e., the tenth lens 41, included in the fourth lens group G4. If a value of vd_10 is equal to or less than 75, lateral chromatic aberration that may be generated by moving the second lens group G2 during zooming may not be compensated.

Also, the tenth lens 41 may include at least one aspheric surface, and may effectively remove astigmatism that is generated during zooming.

The zoom lens system according to an exemplary embodiment may satisfy Condition 2 below:

$$65 < vd\_2 < 72,\qquad\text{[Condition 2]}$$

where vd_2 denotes an Abbe number of a line d of the second lens 12 which is second closer to the object O in the first lens group G1, i.e., a chromatic value.

Condition 2 defines the Abbe number of a lens, i.e., the second lens 12, in the first lens group G1 second closer to the object O. If a value of vd_2 exceeds the above range, chromatic aberration deteriorates. In this case, an additional optical member is necessary for compensating for chromatic aberration, which increases manufacturing costs of the zoom lens system as a whole.

The zoom lens system according to an exemplary embodiment may satisfy Conditions 3-1 and 3-2 below:

$$vd\_3 > 58;\qquad\text{[Condition 3-1]}$$

and $$nd\_3 > 1.55,\qquad\text{[Condition 3-2]}$$

where vd_3 denotes an Abbe number of a line d of the third lens 13 which is third closer to the object O in the first lens group G1, and nd_3 denotes a refractive index of the line d of the third lens 13 which is third closer to the object O in the first lens group G1.

Conditions 3-1 and 3-2 respectively define the Abbe number and the refractive index of a lens, i.e., the third lens 13, in the first lens group G1 third closer to the object O. If a value of vd_3 is equal to or less than 58, lateral chromatic aberration may not be effectively compensated in the tele-mode. If a value of nd_3 is equal to or less than 1.55, distortion deteriorates.

The zoom lens system according to an exemplary embodiment may satisfy Condition 4 below:

$$35 < Ft/Fw < 40,\qquad\text{[Condition 4]}$$

where Ft denotes a focal length in the tele-mode of the zoom lens system, and Fw denotes a focal length in the wide-mode of the zoom lens system.

Condition 4 defines magnification of the zoom lens system according to an exemplary embodiment. The zoom lens system according to an exemplary embodiment may provide high magnification in the range from about 35 to about 40 times.

The zoom lens system according to an exemplary embodiment may satisfy Condition 5 below:

$$1.6 \le Fno\_w \le 1.9,\qquad\text{[Condition 5]}$$

where Fno_w denotes an F-number of the zoom lens system in the wide-mode.

The zoom lens system according to an exemplary embodiment may satisfy Condition 6 below:

$$D16 \ge 1.8\ \text{mm},\qquad\text{[Condition 6]}$$

where D16 denotes a distance between the eighth lens 31 which is closest to the object O in the third lens group G3 and the ninth lens 32 which is second closer to the object O in the third lens group G3.

If a value of D16 is less than 1.8 mm, since Fno does not satisfy the above range, a generally dark zoom lens system is implemented, and it is difficult to compensate for spheric aberration.

The zoom lens system according to an exemplary embodiment may satisfy Conditions 7-1 and 7-2 below:

$$Nd\_1 > 1.8;\qquad\text{[Condition 7-1]}$$

and $$ED\_1 \le 40\ \text{mm},\qquad\text{[Condition 7-2]}$$

where Nd_1 denotes a refractive index of the first lens 11, and ED_1 denotes an effective diameter of the first lens 11.

Conditions 7-1 and 7-2 respectively define the refractive index and the effective diameter of a lens, i.e., the first lens 11, which is closest to the object O in the first lens group G1. If values of Nd_1 and ED_1 are out of the above ranges, the effective diameter increases, and miniaturization is difficult.

A photographing apparatus, such as a CCTV, not only captures an image during the day, but also at night. In order to obtain a high quality image, the CCTV may include filters suitable for day and night photographing.

The zoom lens system according to an exemplary embodiment may have an overall length in the range from about 81 to about 88, and thus, being miniaturized and provide a back focal length enough to easily exchange an optical member such as a filter.

More specifically, the zoom lens system according to an exemplary embodiment may satisfy Condition 8 below:

$$4.8\ \text{mm} \le BFL,\qquad\text{[Condition 8-1]}$$

where BFL denotes a back focal length.

Condition 8 defines a back focal length of the zoom lens system. If a value of BFL is smaller than 4.8 mm, in a case where the zoom lens system is applied to the CCTV, a sufficient space necessary for exchanging filters for day and night photographing may not be provided. The optical member such as the filter may not be exchanged, which makes it impossible to perform day or night photographing.

More specifically, BFL may satisfy Condition 8-2 below:

$$4.8\ \text{mm} \le BFL \le 7.2\ \text{mm}\qquad\text{[Condition 8-2]}$$

If a value of BFL is smaller than 4.8 mm, since the optical member such as the filter may not be exchanged, day or night photographing may be performed. If the value of BFL is greater than 7.2 mm, since the overall length increases, miniaturization is difficult.

Design data of a zoom lens system according to an exemplary embodiment will now be described. The inventive concept is not limited to the embodiment below and may be appropriately modified without departing from the scope thereof.

Hereinafter, R denotes a radius of curvature, Dn denotes a thickness at a center of a lens or an interval between lenses, nd denotes a refractive index of the line d, vd denotes the Abbe number of the line d, and * denotes an aspheric surface.

The aspheric surfaces described above may be defined as follows.

When an optical axis direction is an x-axis, and a direction perpendicular to the optical axis direction is a y-axis, an aspheric shape of a zoom lens according to an exemplary embodiment may be represented by Equation 9 below, where a proceeding direction of the beam is positive. In Equation 9, x denotes a distance from a peak of the zoom lens in the optical axis direction, y denotes a distance from the y-axis in the direction perpendicular to the optical axis direction, k denotes a conic constant, A, B, C, and D each denote an aspheric coefficient, and c denotes an inverse number (1/R) of a radius of curvature at the peak of the zoom lens.

$$x = \frac{cy^2}{1 + \sqrt{1 - (k+1)c^2 y^2}} + Ay^4 + By^6 + Cy^8$$

First Embodiment

Figure 2:
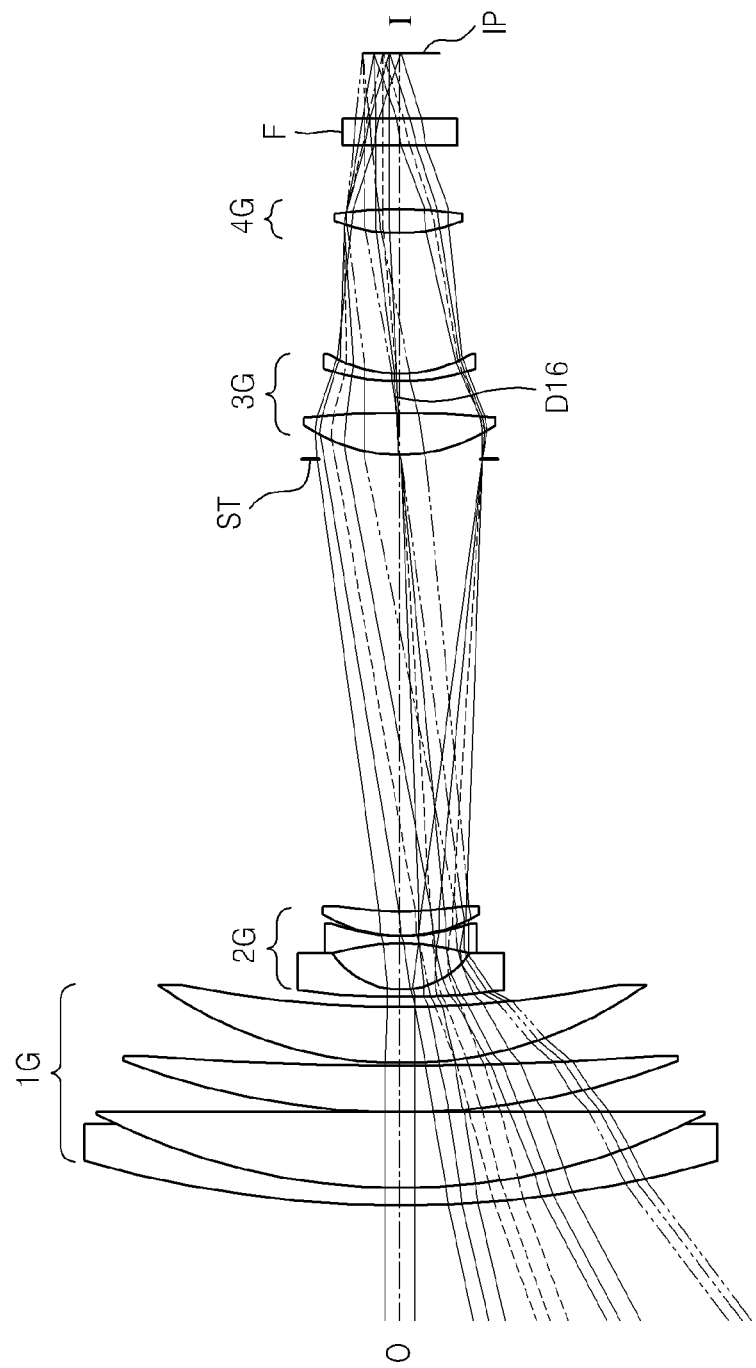
FIG. 2 illustrates a zoom lens system, according to a first exemplary embodiment.

A construction of the zoom lens system based on design data of a first embodiment is illustrated in FIG. 2. Table 1 below shows the design data of the zoom lens system shown in FIG. 2.

Focal length($f$)=3.56-128.4 (mm)

$Fno$=1.715-3.956

TABLE 1

| Surface No. | Rn | Dn | nd | vd |
|---|---|---|---|---|
| S1 | 70.8649 | 1.200 | 1.846663 | 23.78 |
| S2 | 40.6122 | 5.540 | 1.487489 | 70.44 |
| S3 | Infinity | 0.150 | | |
| S4 | 52.4293 | 3.019 | 1.589130 | 61.14 |
| S5 | 190.3664 | 0.150 | | |
| S6 | 27.0098 | 4.166 | 1.496997 | 81.61 |
| S7 | 77.4030 | Variable D7 | | |
| S8 | 54.6512 | 0.550 | 1.910822 | 35.25 |
| S9 | 5.7598 | 3.312 | | |
| S10 | −16.7526 | 0.500 | 1.658436 | 50.85 |
| S11 | 11.6374 | 0.150 | | |
| S12 | 10.2358 | 1.749 | 1.945945 | 17.98 |
| S13 | 49.4851 | Variable D13 | | |
| S14(ST) | Infinity | 0.400 | | |
| *S15 | 9.7582 | 2.690 | 1.693500 | 53.2 |
| *S16 | −80.8777 | 2.429 | | |
| S17 | 12.8082 | 0.500 | 1.945945 | 17.98 |
| S18 | 7.3847 | Variable D18 | | |
| *S19 | 11.8075 | 1.685 | 1.497103 | 81.56 |
| *S20 | −22.6039 | Variable D20 | | |
| S21 | Infinity | 1.900 | | |
| S22 | Infinity | 4.560 | | |
| IP | Infinity | | | |

Table 2 shows aspheric coefficients in the zoom lens system of FIG. 1, and Table 3 shows variable distances at the wide-mode, the middle-mode, and the tele-mode.

TABLE 2

| | S15 | S16 | S19 | S20 |
|---|---|---|---|---|
| K | 0 | 0 | 0 | 0 |
| A | −9.3504E−05 | 6.5444E−05 | −3.0722E−04 | −2.1568E−04 |
| B | −8.9388E−07 | −8.6294E−07 | 1.0732E−05 | 8.4720E−06 |
| C | −1.8102E−09 | 1.0374E−08 | −1.1788E−06 | −1.0043E−06 |

TABLE 3

| | D7 | D13 | D18 | D20 |
|---|---|---|---|---|
| Wide-mode | 0.650 | 31.838 | 10.186 | 4.3356 |
| Middle-mode 1 | 17.603 | 14.885 | 5.5075 | 9.0142 |
| Middle-mode 2 | 26.556 | 5.933 | 2.8950 | 11.6266 |
| Tele-mode | 30.488 | 2.000 | 14.3217 | 0.2000 |

Figure 3:
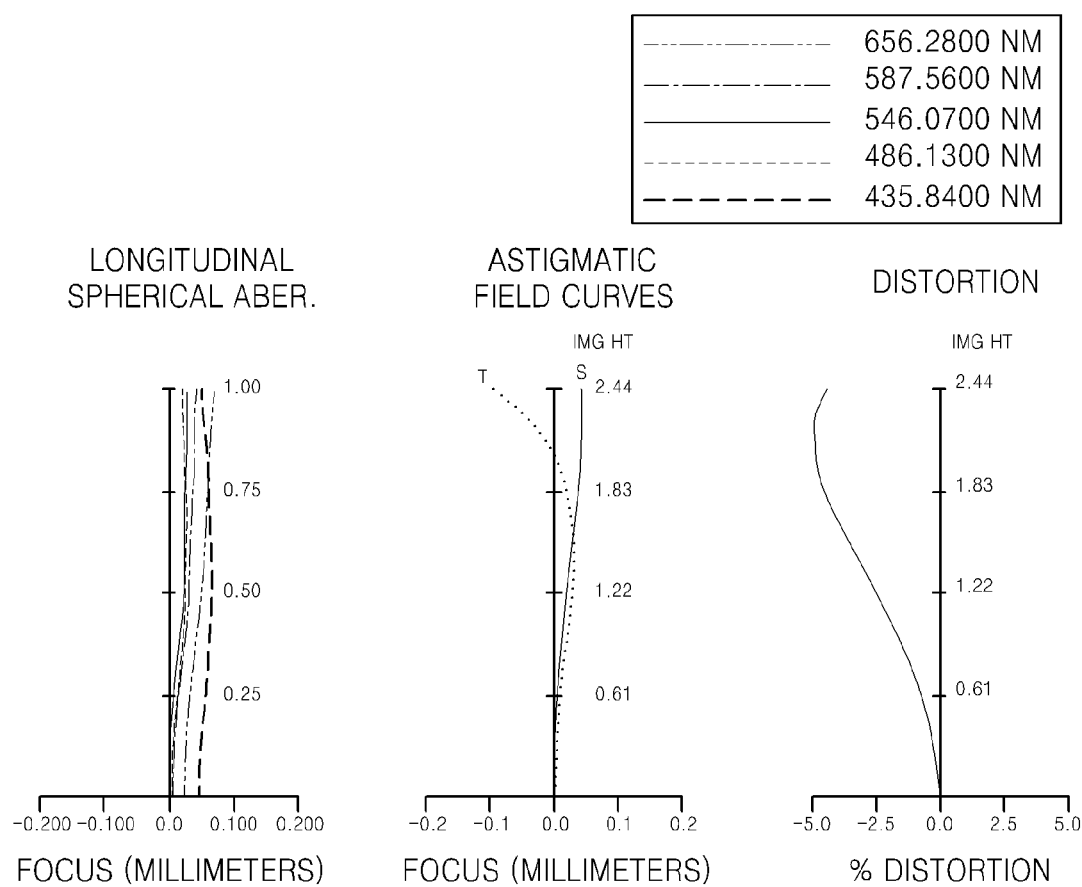
FIG. 3 illustrates longitudinal spherical aberration, astigmatism, and distortion at the wide-mode of the zoom lens system of FIG. 2, according to an exemplary embodiment.

FIG. 3 illustrates longitudinal spherical aberration, astigmatism, and distortion of the zoom lens system of FIG. 2. In a graph regarding a curvature of image field, in an astigmatic field curve, a dotted line denotes tangential astigmatism, and a solid line denotes sagittal astigmatism. The longitudinal spherical aberration is shown with respect to light having wavelengths of about 656.28 nm, about 587.56 nm, about 546.07 nm, about 486.13 nm, and about 435.84 nm, and the astigmatism and the distortion are shown with respect to light having a wavelength of about 546.07 nm.

Figure 4:
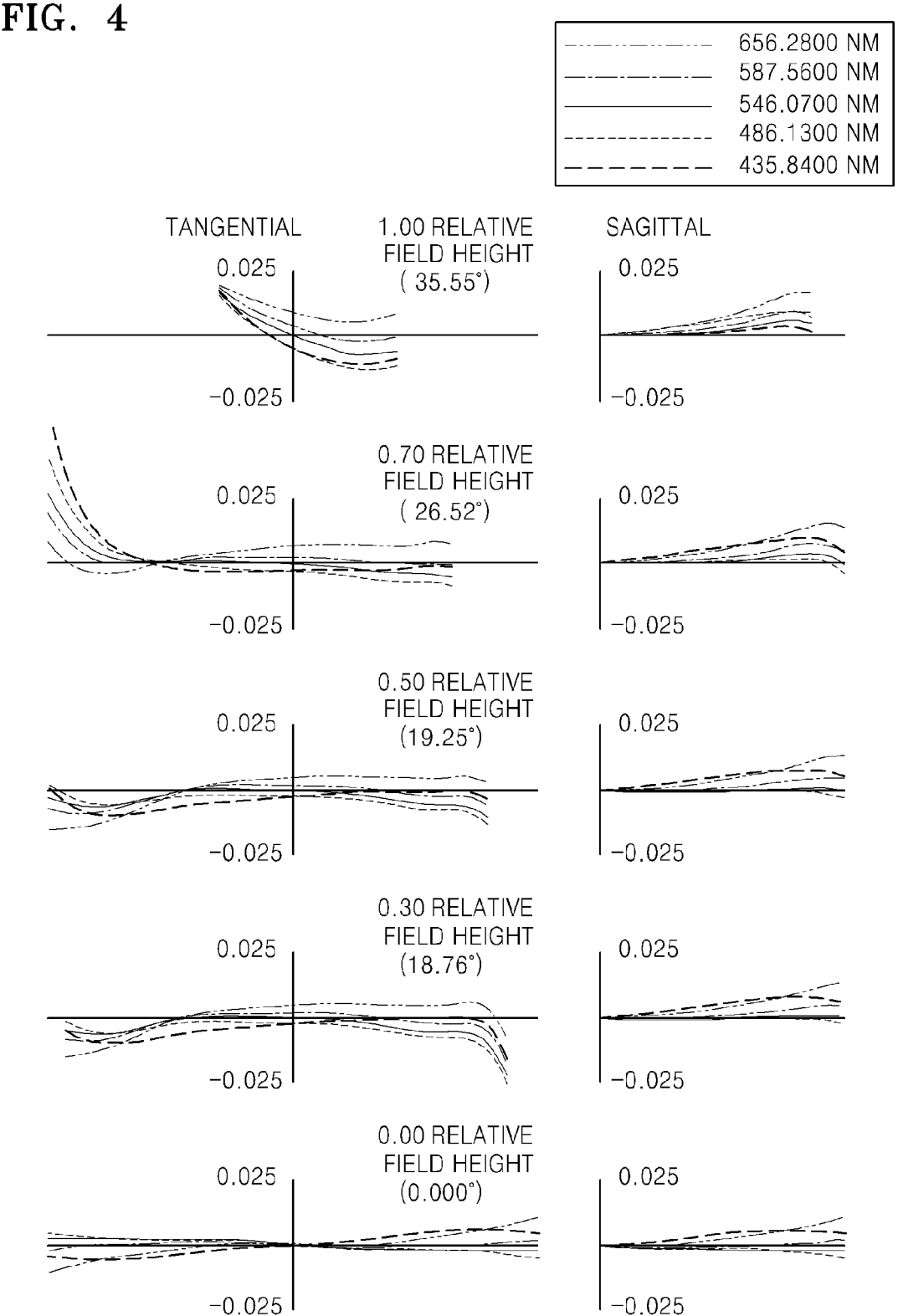
FIG. 4 illustrates comma aberration at the wide-mode of the zoom lens system of FIG. 2, according to an exemplary embodiment.

FIG. 4 illustrates comma aberration. Left graphs show tangential comma aberration, and right graphs show sagittal comma aberration.

Second Embodiment

A construction of the zoom lens system based on design data of the second embodiment is illustrated in FIG. 2. Table 4 below shows the design data of the zoom lens system shown in FIG. 2.

Focal length($f$)=3.56-128.3 (mm)

$Fno$=1.7-3.93

TABLE 4

| Surface No. | Rn | Dn | nd | vd |
|---|---|---|---|---|
| S1 | 70.6812 | 1.200 | 1.846663 | 23.78 |
| S2 | 40.6887 | 5.230 | 1.487489 | 70.44 |
| S3 | −772.3237 | 0.150 | | |
| S4 | 52.2377 | 2.778 | 1.606250 | 63.71 |
| S5 | 149.5270 | 0.150 | | |
| S6 | 26.7653 | 4.154 | 1.496997 | 81.61 |
| S7 | 78.2261 | Variable D7 | | |
| S8 | 29.0772 | 0.550 | 1.910822 | 35.25 |
| S9 | 7.1121 | 3.743 | | |
| S10 | −14.4738 | 0.650 | 1.658436 | 50.85 |
| S11 | 7.8178 | 0.600 | | |
| S12 | 9.2461 | 1.909 | 1.945945 | 17.98 |
| S13 | 27.2049 | Variable D13 | | |
| S14(ST) | Infinity | 0.500 | | |
| *S15 | 11.4086 | 2.457 | 1.693500 | 53.2 |
| *S16 | −50.0070 | 3.779 | | |
| S17 | 20.8411 | 0.500 | 1.945945 | 17.98 |
| S18 | 9.3448 | Variable D18 | | |
| *S19 | 10.3887 | 1.865 | 1.497103 | 81.56 |
| *S20 | −18.8377 | Variable D20 | | |
| S21 | Infinity | 2.010 | | BSC7_HOYA |
| S22 | Infinity | 4.500 | | |
| IP | Infinity | | | |

Figure 5:
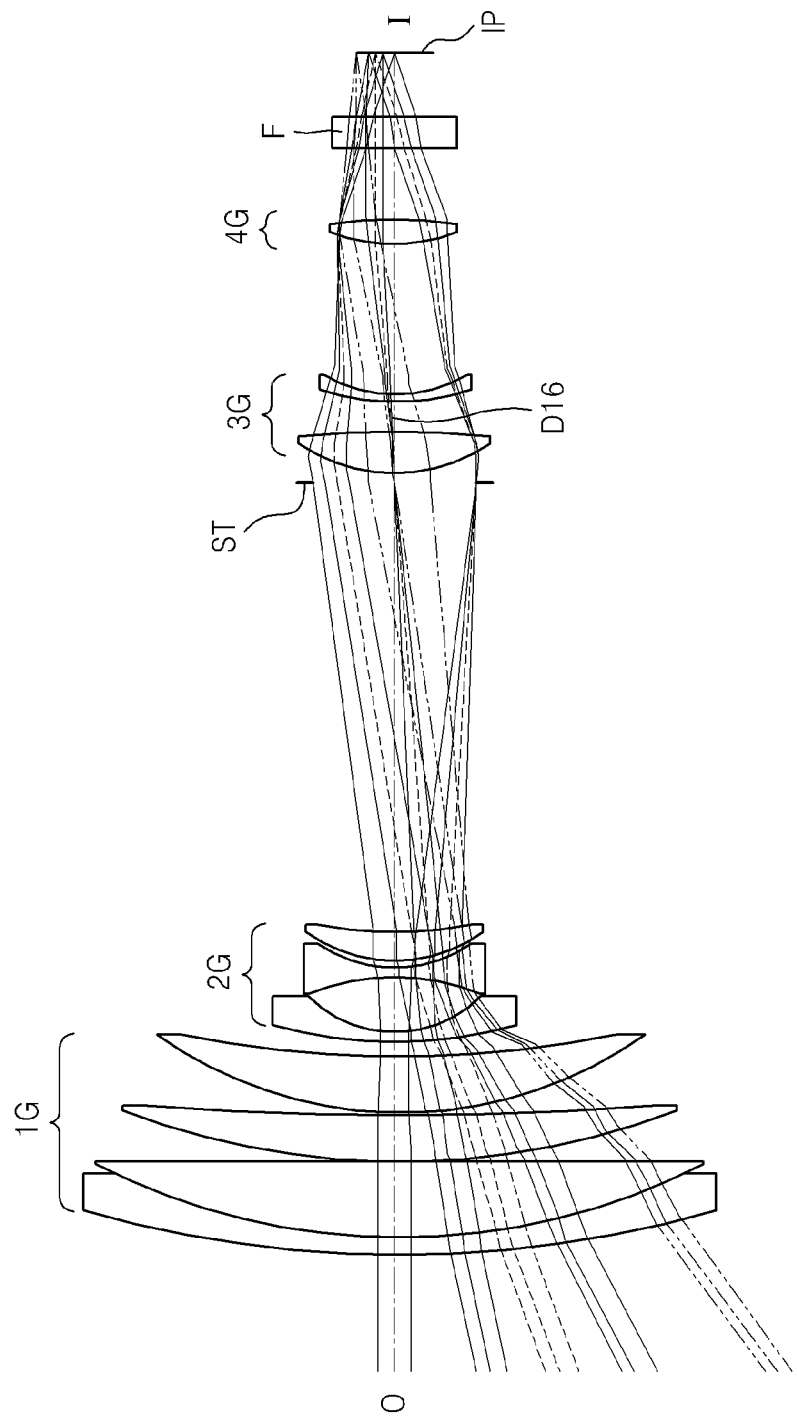
FIG. 5 illustrates a zoom lens system, according to a second exemplary embodiment.

Table 5 shows aspheric coefficients in the zoom lens system of FIG. 5, and Table 6 shows variable distances at the wide-mode, the middle-mode, and the tele-mode.

TABLE 5

|   | S15 | S16 | S19 | S20 |
|---|---|---|---|---|
| K | 0 | 0 | 0 | 0 |
| A4 | −3.3075E−05 | 9.8359E−05 | −1.0133E−04 | 3.4947E−05 |
| B | −1.1720E−06 | −8.3109E−07 | 3.8654E−06 | 9.0006E−06 |
| C | 4.9999E−08 | 4.4755E−08 | −1.9447E−07 | −3.5398E−07 |

TABLE 6

|   | D7 | D13 | D18 | D20 |
|---|---|---|---|---|
| Wide-mode | 0.700 | 30.538 | 9.171 | 4.6671 |
| Middle-mode 1 | 24.014 | 7.224 | 2.7000 | 11.1384 |
| Middle-mode 2 | 27.924 | 3.313 | 6.7682 | 7.0702 |
| Tele-mode | 29.238 | 2.000 | 13.6384 | 0.2000 |

Figure 6:
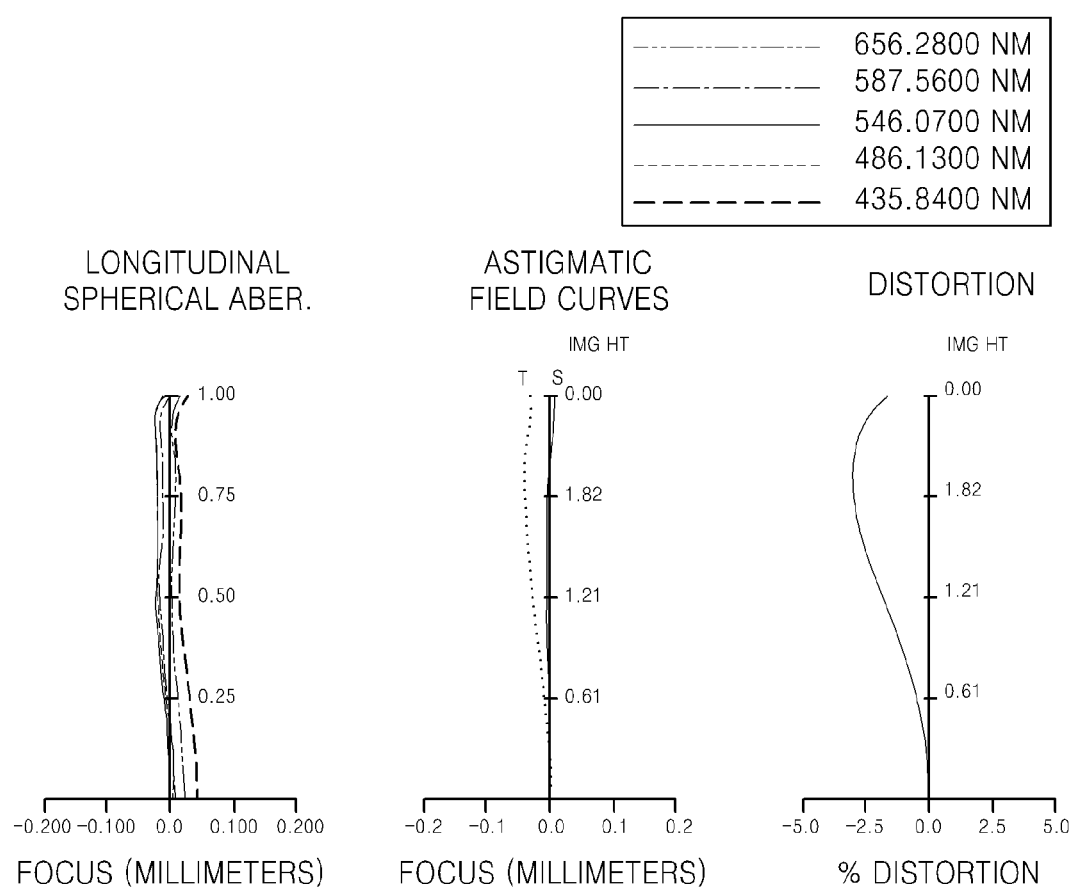
FIG. 6 illustrates longitudinal spherical aberration, astigmatism, and distortion at the wide-mode of the zoom lens system of FIG. 5, according to an exemplary embodiment.

FIG. 6 illustrates longitudinal spherical aberration, astigmatism, and distortion of the zoom lens system of FIG. 5. In a graph regarding a curvature of image field, in an astigmatic field curve, a dotted line denotes tangential astigmatism, and a solid line denotes sagittal astigmatism. The longitudinal spherical aberration is shown with respect to light having wavelengths of about 656.28 nm, about 587.56 nm, about 546.07 nm, about 486.13 nm, and about 435.84 nm, and the astigmatism and the distortion are shown with respect to light having a wavelength of about 546.07 nm.

Figure 7:
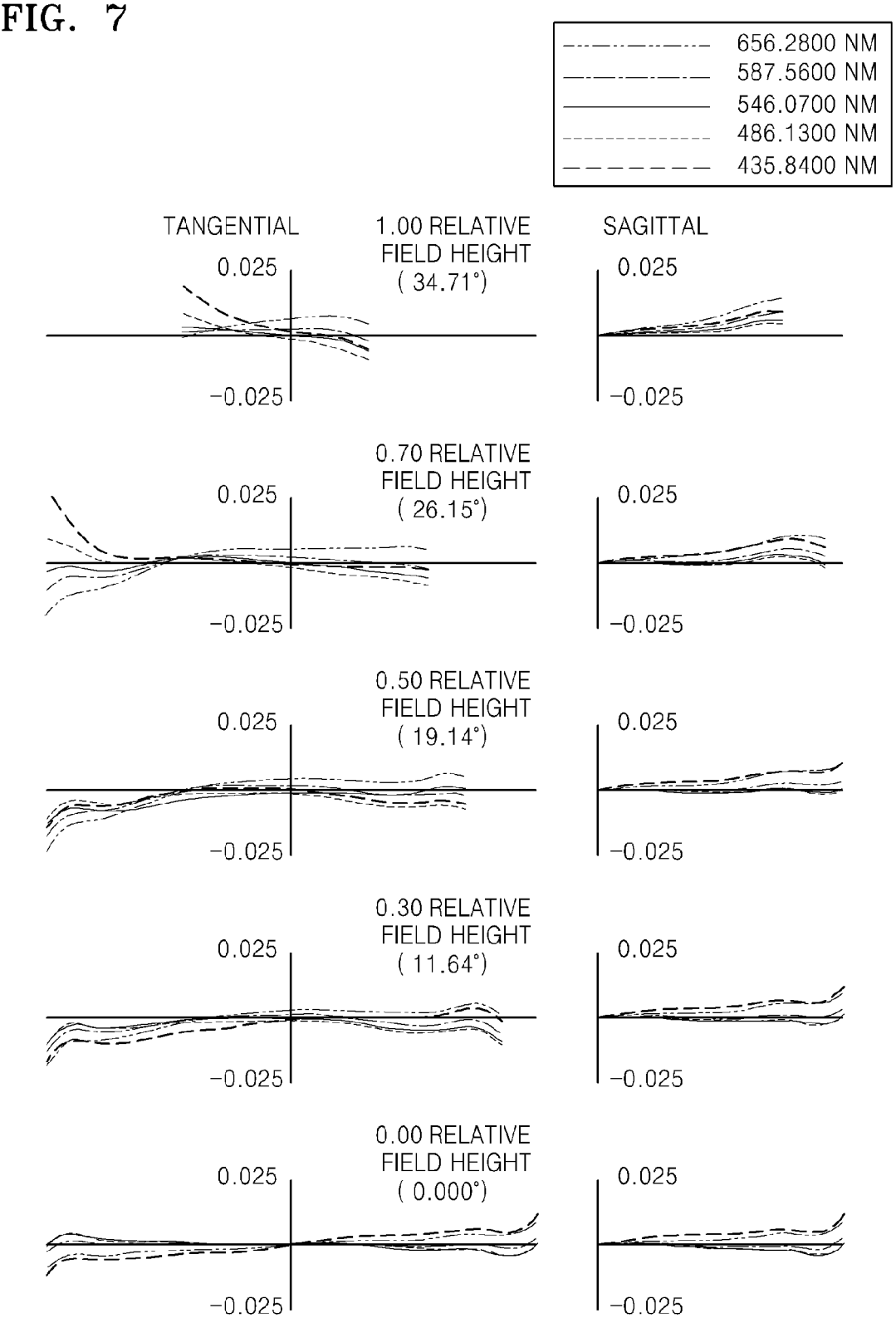
FIG. 7 illustrates comma aberration at the wide-mode of the zoom lens system of FIG. 5, according to an exemplary embodiment.

FIG. 7 illustrates comma aberration. Left graphs show tangential comma aberration, and right graphs show sagittal comma aberration.

Table 7 below shows values of Conditions 1 through 8 of the first and second embodiments.

TABLE 7

|   | Condition 1 | Condition 2 | Condition 3-1 | Condition 3-2 | Condition 4 |
|---|---|---|---|---|---|
| Embodiment 1 | 81.56 | 70.44 | 61.14 | 1.589130 | 36.07 |
| Embodiment 2 | 81.56 | 70.44 | 63.71 | 1.606250 | 36.04 |

|   | Condition 5 | Condition 6 | Condition 7-1 | Condition 7-2 | Condition 8 |
|---|---|---|---|---|---|
| Embodiment 1 | 1.715 | 2.429 | 1.846663 | 39.8 | 6.6 |
| Embodiment 2 | 1.7 | 3.779 | 1.846663 | 39.8 | 6.6 |

According to the exemplary embodiments, a zoom lens system having a relatively short overall length even with a small number of lenses, relatively high magnification, and relatively high resolution may be realized.

In addition, the zoom lens system may obtain a sufficiently long BFL, and thus, a filler may be easily exchanged when the zoom lens system is applied to a surveillance camera.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A zoom lens system comprising, in an order from an object to an image:

a first lens group having positive refractive power;
a second lens group having negative refractive power;
a third lens group having positive refractive power; and
a fourth lens group having positive refractive power,
wherein zooming is performed by changing intervals between the first through fourth lens groups, and a lens included in the fourth lens group satisfies:

$vd\_10 > 75$, wherein vd_10 denotes an Abbe number of a line d of the lens included in the fourth lens group,
wherein a second lens second closest to the object in the first lens group satisfies:

$70 < vd\_2 < 72$, wherein vd_2 denotes an Abbe number of the line d of the second lens,
wherein each of the first through fourth lens groups includes a different number of lenses, and the number of lenses decreases in an order from the first group to the fourth group,
wherein the third lens group comprises two lenses, and each of all two lenses included in the third lens group has an Abbe number less than 55,
wherein the second lens group comprises three lenses and the third lens group has only two lenses, and two of the three lenses included in the second lens group and one of the two lenses included in the third lens group have a refractive index greater than 1.9, and
wherein only the first lens group among the first through fourth lens groups comprises a cemented lens.

2. The zoom lens system of claim 1, wherein the fourth lens group comprises a single positive lens.

3. The zoom lens system of claim 1, wherein the lens included in the fourth lens group comprises an aspheric surface.

4. The zoom lens system of claim 1, satisfying:

$35 < Ft/Fw < 40$, wherein Ft denotes a focal length in a tele-mode of the zoom lens system, and Fw denotes a focal length in a wide-mode of the zoom lens system.

5. The zoom lens system of claim 1, satisfying:

$1.6 \leq Fno\_w \leq 1.9$, wherein Fno_w denotes an F-number of the zoom lens system in the wide-mode.

6. The zoom lens system of claim 1, wherein a distance between the lenses in the third lens group is equal to or greater than 1.8 mm.

7. The zoom lens system of claim 1, satisfying:

$4.8 \text{ mm} \leq BFL$, wherein BFL denotes a back focal length of the zoom lens system.

8. The zoom lens system of claim 1, wherein a first lens closest to the object in the first lens group satisfies:

$1.8 \leq Nd\_1 \leq 1.9$; and $ED\_1 \leq 40 \text{ mm}$, wherein Nd_1 denotes a refractive index of the first lens, and ED_1 denotes an effective diameter of the first lens.

9. The zoom lens system of claim 1, wherein a third lens third closest to the object in the first lens group satisfies:

$vd\_3 > 58$; and $nd\_3 > 1.55$, wherein vd_3 denotes an Abbe number of the line d of the third lens, and nd_3 denotes a refractive index of the line d of the third lens.

10. The zoom lens system of claim 1, wherein the second lens group and the fourth lens group move during zooming, and the first lens group and the third lens group are fixed.

11. The zoom lens system of claim 1, wherein the third lens group comprises a positive lens and a negative lens in the order from the object.

12. The zoom lens system of claim 11, wherein the third lens group comprises at least one aspheric surface.

13. A zoom lens system comprising, in an order from an object to an image:
    a first lens group having positive refractive power;
    a second lens group having negative refractive power;
    a third lens group having positive refractive power; and
    a fourth lens group having positive refractive power,
    wherein zooming is performed by changing intervals between the first through fourth lens groups, and a total number of lenses forming the first through fourth lens groups is less than or equal to 10,
    wherein a second lens second closest to the object in the first lens group satisfies:

$$70 < vd\_2 < 72,$$

wherein vd_2 denotes an Abbe number of the line d of the second lens,
    wherein each of the first through fourth lens groups includes a different number of lenses, and the number of lenses decreases in an order from the first group to the fourth group,
    wherein the third lens group comprises two lenses, and each of all two lenses included in the third lens group has an Abbe number less than 55,
    wherein the second lens group comprises three lenses and the third lens group has only two lenses, and two of the three lenses included in the second lens group and one of the two lenses included in the third lens group have a refractive index greater than 1.9, and
    wherein only the first lens group the first through fourth lens groups comprises a cemented lens.

14. The zoom lens system of claim 13, wherein the fourth lens group comprises a single positive lens.

15. The zoom lens system of claim 14, wherein the single positive lens comprises an aspheric surface.

16. The zoom lens system of claim 13, wherein a lens included in the fourth lens group satisfies:

$$vd\_10 > 75,$$

wherein vd_10 denotes an Abbe number of a line d of the lens included in the fourth lens group.

17. The zoom lens system of claim 13, satisfying:

$$35 < Ft/Fw < 40,$$

wherein Ft denotes a focal length in a tele-mode of the zoom lens system, and Fw denotes a focal length in a wide-mode of the zoom lens system.

* * * * *